United States Patent
Li et al.

(10) Patent No.: US 8,620,543 B2
(45) Date of Patent: Dec. 31, 2013

(54) SYSTEM AND METHOD FOR ESTIMATING TORQUE IN A POWERTRAIN

(75) Inventors: Dongxu Li, Troy, MI (US); Kumaraswamy V. Hebbale, Troy, MI (US); Farzad Samie, Franklin, MI (US); Chunhao J. Lee, Houston, TX (US); Chi-Kuan Kao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/446,097

(22) Filed: Apr. 13, 2012

(65) Prior Publication Data

US 2013/0275015 A1     Oct. 17, 2013

(51) Int. Cl.
   *G01M 17/00*    (2006.01)

(52) U.S. Cl.
   USPC .......................................................... 701/55

(58) Field of Classification Search
   USPC .......................................................... 701/55
   See application file for complete search history.

(56) References Cited

U.S. PATENT DOCUMENTS

| | | | |
|---|---|---|---|
| 4,720,793 A * | 1/1988 | Watanabe et al. | 701/54 |
| 5,559,705 A * | 9/1996 | McClish et al. | 701/110 |
| 5,636,121 A * | 6/1997 | Tsuyama et al. | 701/70 |
| 6,199,005 B1 * | 3/2001 | Iwata | 701/87 |
| 6,306,062 B1 * | 10/2001 | Toukura et al. | 477/107 |
| 6,418,365 B1 * | 7/2002 | Loffler et al. | 701/51 |
| 6,487,486 B1 * | 11/2002 | Anderson | 701/69 |
| 6,513,611 B2 * | 2/2003 | Ito et al. | 180/179 |
| 7,104,119 B1 * | 9/2006 | Trapasso et al. | 73/114.26 |
| 7,110,869 B2 * | 9/2006 | Tao et al. | 701/31.1 |
| 7,162,353 B2 * | 1/2007 | Minowa et al. | 701/96 |
| 7,359,787 B2 * | 4/2008 | Ono et al. | 701/82 |
| 7,400,993 B2 * | 7/2008 | Shaver et al. | 702/106 |
| 7,445,581 B2 * | 11/2008 | Cring | 477/174 |
| 7,611,441 B2 * | 11/2009 | Cring | 477/174 |
| 7,788,010 B2 * | 8/2010 | Kondo et al. | 701/61 |
| 7,856,337 B2 * | 12/2010 | Kulczyk et al. | 702/145 |
| 7,942,228 B2 * | 5/2011 | Fenker et al. | 180/265 |
| 2010/0279811 A1 * | 11/2010 | Portell et al. | 475/116 |

\* cited by examiner

*Primary Examiner* — Thomas Tarcza
*Assistant Examiner* — Alex C Dunn
(74) *Attorney, Agent, or Firm* — Quinn Law Group, PLLC

(57) ABSTRACT

A vehicle includes a powertrain having first and second rotatable members, speed sensors, and a controller. The speed sensors generate output signals encoding the speeds of the respective first and second rotatable members. The controller calculates a rotation angle of the members using the output signals and estimates a torque value in the powertrain as a function of the rotation angles. The sensors may count the teeth of respective first and second toothed gear elements and encode the count as the output signals. The controller may estimate the torque value as a function of a linear coefficient and the present gear ratio of the sensors. The controller may also detect a commanded upshift of the transmission and detect a fill event of an oncoming clutch of the transmission as a function of the corresponding rotation angles for the rotatable members. The members may be input, output, or intermediate members.

20 Claims, 3 Drawing Sheets

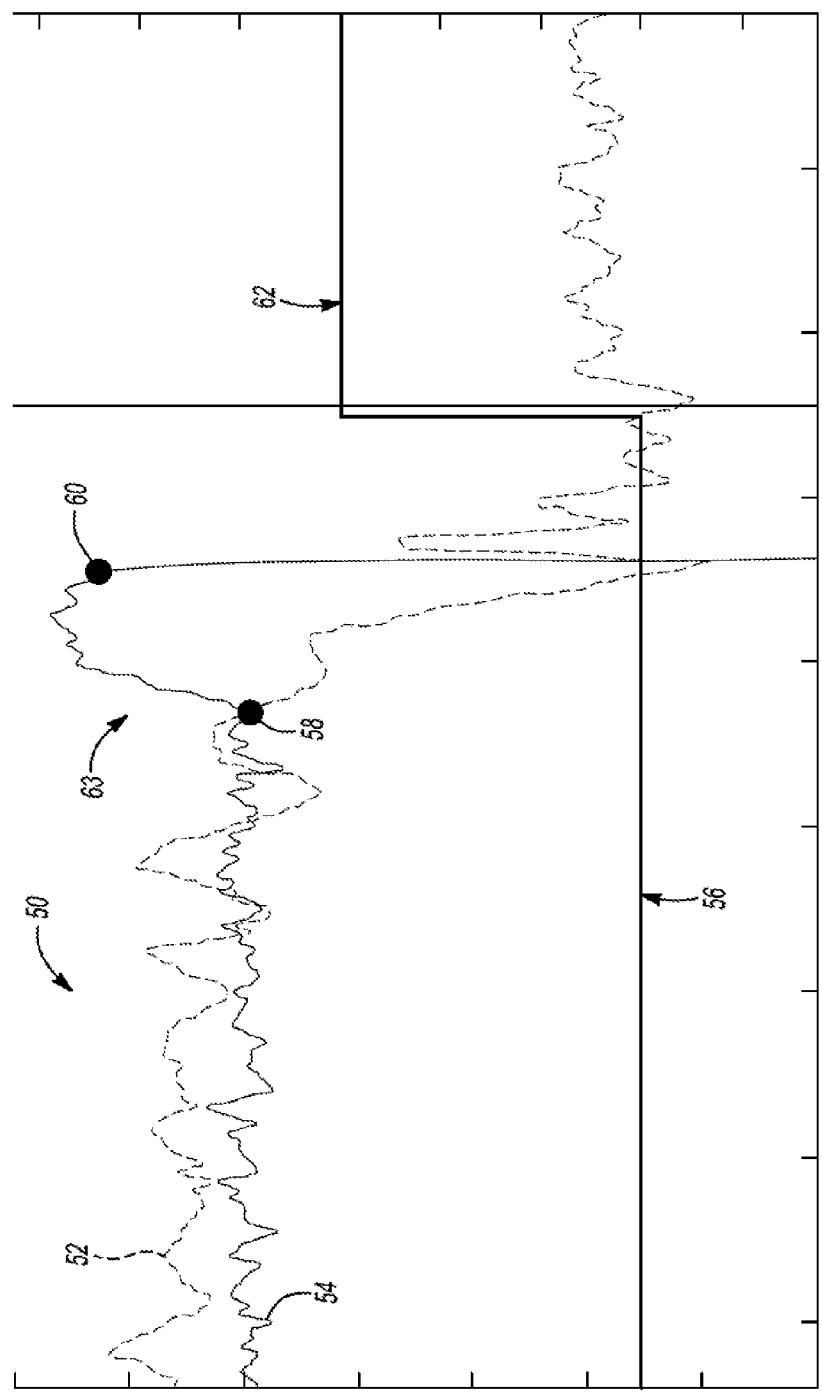

SYSTEM AND METHOD FOR ESTIMATING TORQUE IN A POWERTRAIN

TECHNICAL FIELD

The present disclosure relates to a system and method for estimating torque in a transmission.

BACKGROUND

An input member of a vehicle transmission receives input torque from a prime mover, e.g., an internal combustion engine or an electric traction motor, and transfers this torque to an output member. The output member in turn powers a drive axle to propel the vehicle through a range of output speed ratios. A typical transmission includes multiple clutches, gear sets, and rotatable shafts. The clutches may be fluid-actuated devices having a friction clutch pack. The clutch pack is selectively engaged using a hydraulic piston.

During the fill phase of a clutch-to-clutch shift, a clutch apply cavity of an oncoming clutch must be rapidly filled with fluid. Torque is transferred from the offgoing clutch to the oncoming clutch in the ensuing torque phase. The oncoming clutch is controlled for a smooth apply during the inertia phase. Coordinated control of the offgoing and oncoming clutches is required to avoid an interruption of power flow through the transmission.

SUMMARY

A vehicle is disclosed herein that uses a pair of speed sensors to estimate a torque value in a powertrain. The speed sensors may be positioned with respect to any two rotatable members of the powertrain such as an input and output member of a transmission, put possibly including an intermediate member in other embodiments. As is known in the art, knowledge of torque levels is useful to the overall control of any transmission. However, such torque information is not always readily available. Therefore, the present approach provided to help solve this problem using any two existing speed sensors.

Vehicles typically include at least a transmission input speed sensor (TISS) and a separate transmission output speed sensor (TOSS). These two sensors may be used as set forth herein to closely monitor the input and output sides of the transmission when the transmission is operating. In designs using an intermediate member between the input and output members, a transmission intermediate speed sensor (TMSS) may be used to monitor the speed of the intermediate member. While the TISS, TOSS, and TMSS are described herein in example embodiments, speeds of any two rotatable members of the powertrain may be measured and used for torque estimation, including an engine output shaft, a rotatable member connected to the output shaft, or a rotatable member connected to a transmission output member. Any speed sensors used in the present transmission are in communication with a controller, which is configured to estimate torque levels as set forth herein.

As is understood in the art, any two speeds among input, output, and intermediate speeds in a fixed gear state should be related by a constant ratio. However, it is recognized herein that the various components of a powertrain are not perfectly rigid. As a result, some amount of deformation may occur in the powertrain, e.g., in the transmission, in response to input torque. The discrepancy between the two rotational angles compensated by the ratio reveals changes in deformation inside the transmission that are proportional to the torque. Thus, the present controller may use this discrepancy to estimate torque.

Additionally, when the transmission is shifted into another gear, the controller can monitor the input, output, and intermediate speed signals to determine when the oncoming clutch has been filled. As with torque determination, fill detection is a valuable control term that is not easily determined in most vehicles. Therefore, the present approach enables estimation of both torque and clutch fill in a transmission.

In particular, a vehicle includes a prime mover, a transmission connected to the prime mover, first and second speed sensors, and a controller. The vehicle includes a pair of rotatable members. Each of the first and second speed sensors is positioned with respect to a corresponding one of the rotatable members. The controller, which is in communication with the sensors, calculates a corresponding angle value for the rotatable members using output signals from the respective speed sensors. The controller also estimates a torque value of the powertrain as a function of the corresponding angle values.

A method for estimating a torque value in a vehicle powertrain is also disclosed. The method includes measuring a rotational speed of a first rotatable member of the powertrain using a first speed sensor, and measuring a rotational speed of a second rotatable member of the powertrain using a second speed sensor. Additionally, the method includes generating a first and a second output signal encoding the measured rotational speeds of the respective first and second rotatable members and then calculating, via a controller in communication with the first and the second speed sensors, a corresponding rotation angle for the respective first and second rotatable members using the corresponding first and second output signals. The controller is then used to estimate a torque value of the powertrain as a function of the corresponding rotation angles and to execute a control action with respect to the powertrain using the estimated torque value.

A system for estimating the torque value includes first and second peed sensors positioned with respect to first and second rotatable member, respectively. The first speed sensor generates a first output signal encoding a rotational speed of the first rotatable member. The second speed sensor is likewise positioned with respect to a second rotatable member. The second speed sensor generates a second output signal encoding a rotational speed of the second rotatable member. A controller is in communication with each of the first and second speed sensors. The controller calculates a rotation angle for the first and second rotatable members using the first and second output signals, and also estimates the torque value as a function of the corresponding rotation angles.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic time plot of changing transmission speeds in the vehicle of FIG. 1 that illustrates an example application of the present method.

DETAILED DESCRIPTION

Figure 1:
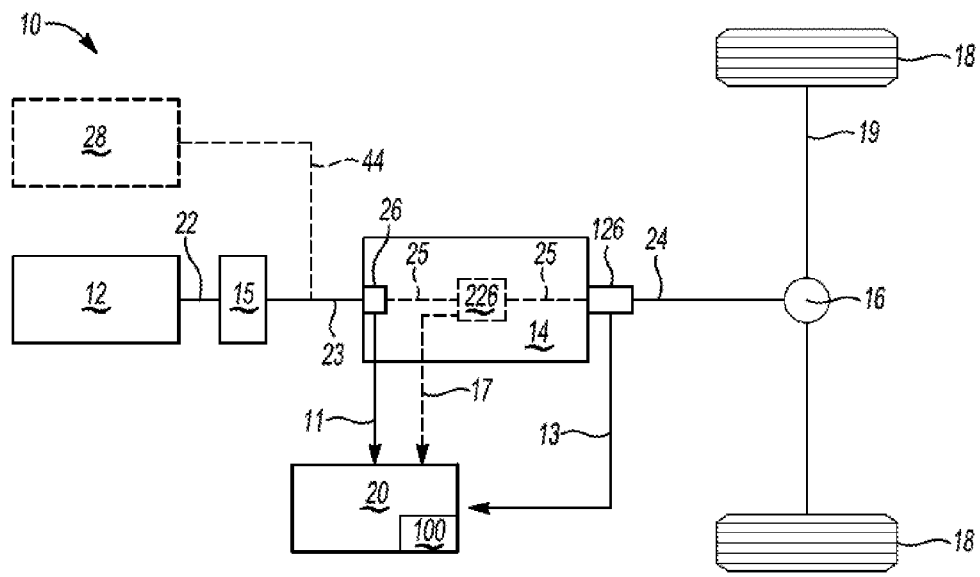
FIG. 1 is a schematic illustration of an example vehicle having a transmission with multiple transmission speed sensors that are used as set forth herein to estimate a torque value in the transmission.

Referring to the drawings, wherein like reference numbers correspond to like or similar components throughout the several figures, an example vehicle 10 is shown schematically in FIG. 1. The vehicle 10 includes a transmission 14 and a controller 20. The controller 20 is configured to execute a method 100 for estimating a torque value of the transmission 14. The torque value may be estimated based on output signals from a pair of speed sensors, for instance output signals (arrows 11 and 13) transmitted to the controller 20 by a respective transmission input speed sensor (TISS) 26 and transmission output speed sensor (TOSS) 126, as set forth in detail below with reference to FIGS. 2-4. In some embodiments one or more transmission intermediate speed sensors (TMSS) 226 may be positioned between the TISS 26 and the TOSS 126. When used, each TMSS 226 generates an output signal (arrow 17) in the same manner as the TISS 26 and the TOSS 126.

The vehicle 10 shown in FIG. 1 includes a prime mover, e.g., an internal combustion engine 12 having an output shaft 22 and/or an optional electric traction motor 28 having a motor shaft 44. The transmission 14 includes respective input and output members 23 and 24, and possibly at least one intermediate member 25 as shown in phantom. The input member 23 receives input torque from the engine 12, and/or from an electric traction motor (not shown) depending on the embodiment. For instance, in a conventional vehicle only the engine 12 may be used as a source of input torque, while a hybrid electric vehicle may use the electric traction motor 28 alone or in conjunction with the engine 12 to deliver torque to the transmission 14.

A torque converter 15 may be used between the engine 12 and the input member 23, as is well understood by those having ordinary skill in the art. The torque converter 15 includes an engine-driven pump (driven member), a stator, and a turbine (driven member), with these components omitted for illustrative simplicity. The speed of the turbine is equal to the speed of the input member 23. The output member 24 delivers output torque from the transmission 14 to a drive axle 19, possibly via a differential 16 as shown. The drive axle 19 ultimately powers a set of drive wheels 18.

The controller 20 of FIG. 1 may include one or multiple digital computers each having one or more microprocessors and required memory, e.g., read only memory (ROM), random access memory (RAM), electrically-erasable programmable read only memory (EEPROM). The controller 20 may also include a high-speed clock, analog-to-digital (A/D) circuitry, digital-to-analog (D/A) circuitry, and any required input/output (I/O) circuitry and devices, as well as signal conditioning and buffering electronics. The controller 20 may be programmed with any required logic for executing the present method 100, an example of which is described below with reference to FIG. 4.

Figure 2:
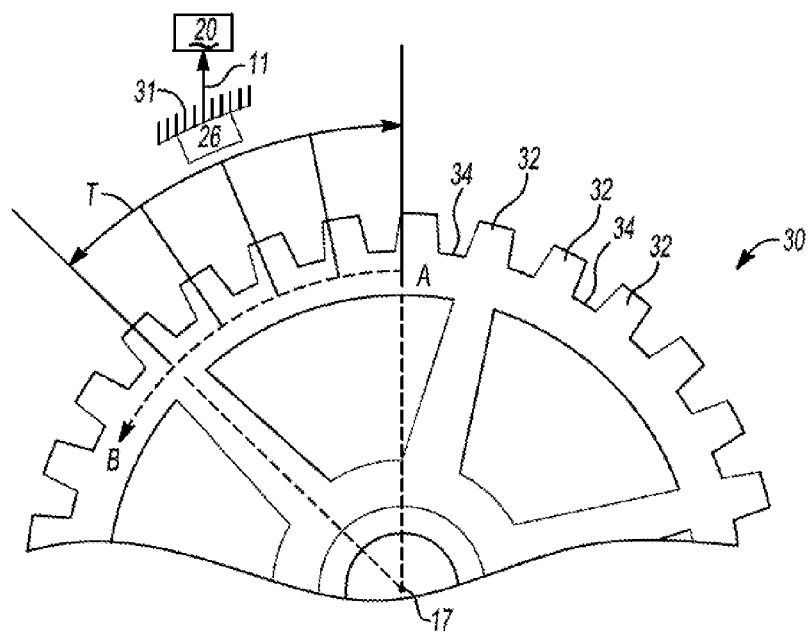
FIG. 2 is a schematic illustration of a portion of an example transmission gear element and a speed sensor for use with the vehicle shown in FIG. 1.

Referring to FIG. 2, an example gear element 30 may be connected to the input member 23 or the output member 24 of the transmission 14 shown in FIG. 1. The gear element 30 includes a plurality of gear teeth 32. Adjacent gear teeth 32 are separated from each other by a root 34. The gear element 30 rotates with respect to a center axis 17. The TISS 26 may be positioned with respect to the gear element 30 in one embodiment, e.g., securely mounted to a stationary member 31 of the transmission 14 of FIG. 1 adjacent to the gear element 30. While the TISS 26 is described for illustrative purposes in FIG. 2, the same description may apply to function of the TOSS 126 and optional TMSS 226 of FIG. 1. Also, while transmission speed sensors are described hereinafter for consistency, those of ordinary skill in the art will appreciate that speeds of any rotatable members may be used to estimate the torque on any two connected members, e.g., the output shaft 22 or another drive shaft powered by the engine 12, or a rotatable member (not shown) that is connected to the output member 24 of the transmission 14.

The TISS 26 monitors the gear teeth 32 of the gear element 30 as the gear element 30 rotates between points A and B. Electric pulses or other processed signals are generated by the TISS 26 in a calibrated window or period T and to the controller 20 as the output signal (arrow 11). As is known in the art, the output signal (arrow 11) encodes the speed of the input member 23. The controller 20 then calculates the rotational angle of the gear element 30 or the corresponding input or output member 23, 24 using this information.

It is recognized herein that the difference between the rotational angle of any two sides of an element of the transmission 14, e.g., the input side of the transmission 14 of FIG. 1 (or the rotational angle of the input side divided by the transmission ratio), and the rotational angle of the output side of the transmission 14 multiplied by the transmission ratio, corresponds to component deformation in the transmission 14. The rotational angles may be respectively determined by the TISS 26 and the TOSS 126 when the input/output speeds are to be measured. When the transmission 14 is in gear, the input member 23 and the output member 24 of the transmission 14 shown in FIG. 1 are mechanically linked. Ideally, the rotational angles of the respective input and output members 23 and 24 differ only by a factor of the gear ratio. However, in actuality the various gear trains, clutches, and shafts of the transmission 14 are not perfectly rigid.

As a result, under a threshold amount of input torque from the engine 12 of FIG. 1 or another prime mover, some amount of deformation occurs inside of the transmission 14. The magnitude of this deformation is proportional to the input torque, given as certain the overall stiffness of the transmission 14. Therefore, the different rotational angles determined by the TISS 26 and TOSS 126 of FIG. 1 can be used as set forth herein to estimate the amount of torque in the transmission 14 shown in the same Figure. Because the transmission 14 is operating in gear, the input torque and the output torque are related by a constant ratio. Therefore, the estimated torque level can be converted to represent either value.

The following formula may be used by the controller 20 to estimate the torque ($T_{EST}$) in the transmission 14 of FIG. 1:

$$T_{EST} = K \Delta \Theta = K(\Theta_1 - R_G \cdot \Theta_2)$$

where K is a linear coefficient, $R_G$ is the present gear ratio between the speed sensor (1) and the speed sensor (2) selected from the TISS 26, TOSS 126, and TMSS 226 of FIG. 1, and $\Theta_1$ and $\Theta_2$ are the measured rotational angles at a corresponding member 23, 24, or 25 corresponding to the pair of speed sensors that are used. The two values are determined, as noted above, as function of the output pulses (arrows 11, 13, 17) transmitted to the controller 20 by the corresponding TISS 26, TOSS 126, and TMSS 226 of FIG. 1. This approach is applicable to any type of transmissions with multiple speed sensors and a mechanical linkage in between.

Figure 3:
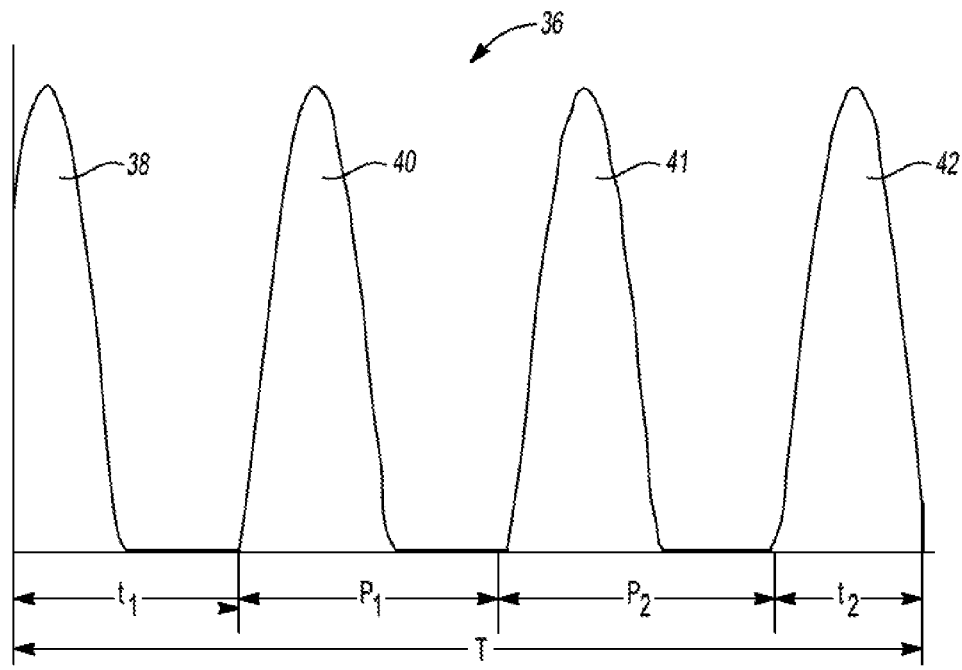
FIG. 3 is a schematic illustration of example output pulses of the speed sensor shown in FIG. 2.

Referring to FIG. 3, a pulse train 36 is shown for an example rotation of the gear element 30 of FIG. 2 over the sample period T. The pulse train 36 includes four example pulses 38, 40, 41, and 42 that are transmitted to the controller 20 by the TISS 26 as the output signal (arrow 11 of FIGS. 1 and 2), or alternatively by the TOSS 126 as the output signal (arrow 13 of FIG. 1) or TMSS 226 as the output signal (arrow 17 of FIG. 1). The output pulses 40 and 41 are full pulses, while the output pulses 38 and 42 are partial pulses. The partial output pulses 38 and 42 thus correspond to a partial rotation of a particular gear tooth 32 and corresponding root 34 (see FIG. 2).

Within the sample period T, a number n of gear teeth 32 of the gear element 30 shown in FIG. 2 rotate past the TISS 26, the TOSS 126, or the TMSS 226 of FIG. 1, depending on whether an input, output, or intermediate speed is being measured. Each measured pulse 38, 40, 41, and 42 is time-stamped so that the period of each measured pulse can be calculated by the controller 20 of FIG. 1. In this manner the TISS 26, TOSS 126, and/or TMSS 226 of FIG. 1 may be used in conjunction with the controller 20 to determine the rotational angles and speeds of the respective input, output, and intermediate members 23, 24, and 25 of FIG. 1.

A given gear tooth 32 of FIG. 2 may begin the period T in a partially rotated state as represented by the partial pulse 38. The next two gear teeth 32 of FIG. 2 are fully counted in this example, with this information communicated to the controller 20 of FIG. 1 as the full pulses 40 and 41. The period T ends in FIG. 2 before the last gear tooth 32 has fully rotated past the particular speed sensor being used, as represented by the partial pulse 42.

Thus, full sub-periods $P_1$ and $P_2$ represent the counting of a full pair of gear teeth 32 and a corresponding root 34 of FIG. 2, while partial sub-periods $t_1$ and $t_2$ represent a counting of less than a full pair of gear teeth 32 and root 34. The extent of any given gear tooth 32 and corresponding root 34 that is fully counted may be represented as $$\frac{2\pi}{N},$$

where N is the total number of teeth 32 of the gear element 30 shown in FIG. 2. Likewise, a partially counted gear tooth 32 and corresponding root 34 may be represented as $$\frac{t_n}{P_1} \cdot \frac{2\pi}{N}.$$

The controller 20 of FIG. 1 may apply the closest full pulse to calculate the angles associated with starting and ending partial pulses, i.e., $\phi_{INITIAL}$ and $\phi_{FINAL}$, for each period T using the following formula:

$$\phi_{INITIAL} = \frac{t_1}{P_1} \text{ and } \phi_{FINAL} = \frac{t_2}{P_2}$$

The controller 20 can then convert the number of partially- and fully-rotated gear teeth 32 and root 34 pairs of FIG. 2 in the period T into a rotation angle θ using the following formula:

$$\theta(k) = \frac{\phi_{INITIAL}(k) + \phi_{FINAL}(k) + n(k)}{N}$$

where n(k) is the number of completely rotated teeth 32 in the period T. The controller 20 of FIG. 1 may automatically correct for error in each period T by ensuring that $1-\phi_{FINAL}(k-1)=\phi_{INITIAL}(k)$. Here, k is the index of the sample period T.

Figure 4:
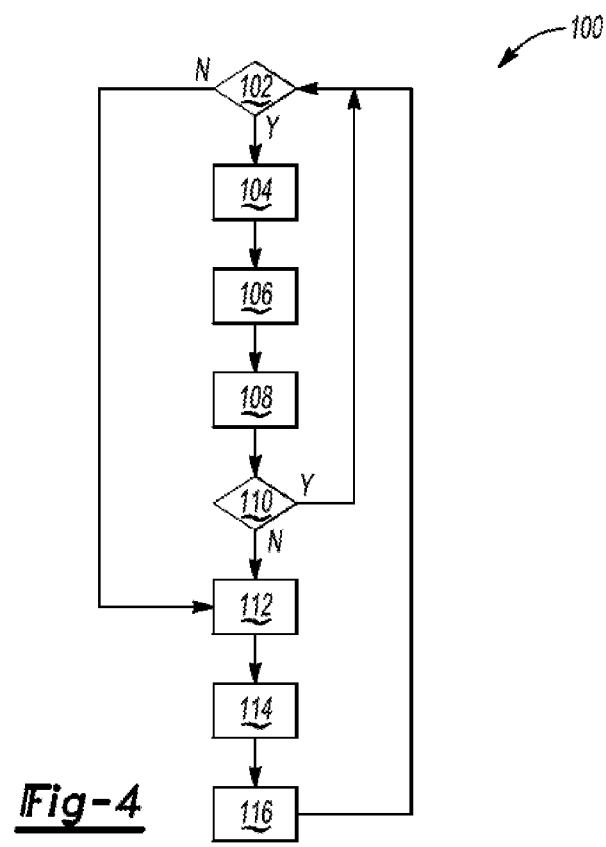
FIG. 4 is a flow chart describing an example method for estimating torque in the vehicle of FIG. 1.

Referring to FIG. 4, an example method 100 is shown for estimating a torque value in the transmission 14 of FIG. 1, e.g., using any two existing transmission speed sensors such as the TISS 26, TOSS 126, and/or TMSS 226.

With reference to the vehicle 10 of FIG. 1, and using the TISS 26 and TOSS 126 as the two sensors in a non-limiting illustrative example, the method 100 begins at step 102, wherein the controller 20 determines whether the transmission 14 is in a predetermined state in which there is fixed mechanical linkage between the two speed sensors being used. The method 100 proceeds to step 104 if this is the case. Otherwise, the method 100 proceeds to step 112.

At step 104, the controller 20 receives the measured and time-stamped information from the TISS 26 and TOSS 126, and thereafter separately calculates the rotation of the input member 23 and output member 24 as noted above. The method 100 then proceeds to step 106.

At step 106, the controller 20 calculates the accumulated angles $\Theta=\Sigma\theta(k)$ for each of the speed sensors, and then estimates the relative torque, i.e.:

$$T_{EST}=K\Delta\Theta=K(\Theta_1-R_G\cdot\Theta_2).$$

In this example, $\Theta_1$ and $\Theta_2$ are the respective measured input and output rotational angles. The method 100 then proceeds to step 108.

At step 108, the controller 20 performs a first control action using the estimated torque from step 106. Various control actions are possible, including maintaining the present steady-state mode, determining gain values as a function of the estimated torque, and determining how to optimally transition to the next mode in response to a commanded upshift or downshift, thereby improving shift feel and fuel economy. The method 100 proceeds to step 110 after completing step 108.

At step 110, the controller 20 determines whether the state determined at step 102 is still active. In one embodiment, step 110 may entail detecting a commanded shift, e.g., a power-on upshift of the transmission 14. The method 100 proceeds to step 112 if the predetermined state is no longer active. If the predetermined state is still active, the method 100 instead repeats step 102.

At step 112 the controller 20 may perform a second control action. An example control action is illustrated via the traces 50 of FIG. 5, the amplitudes (A) of which are plotted against time (t). Traces 52 and 54 respectively represent a measured torque from a physical sensor and the estimated torque using the output signals (arrows 11 and 13 of FIG. 1) from the respective TISS 26 and TOSS 126. The physical sensor may be used offline to verify the accuracy of the present torque estimation approach, and is not intended to be used on the actual vehicle 10 of FIG. 1 in operation. Trace 56 represents a steady-state mode, e.g., $2^{nd}$ gear, which is the state in which the transmission 14 operates prior to executing a shift. Torque is estimated in such mode as explained above in steps 104-108.

The traces 52 and 54 begin to diverge at approximately point 58 as the transmission 14 starts executing a clutch-to-clutch shifting. Before that, hydraulic passage is controlled so that fluid is routed to fill the chamber of the oncoming clutch so that the pressure can be regulated once filled. It is desired to know the time of the oncoming clutch being filled and both offgoing and oncoming clutches can be controlled coordinately for a smooth shift. Once the oncoming clutch is filled to gain torque capacity, without releasing the offgoing clutch, the compliance or deformation of the transmission 14 changes. This can be readily detected from the disparate rotation angles of the input and output sides of the transmission 14 as noted above. Under a fixed input torque from the engine 12, the change in compliance or deformation due to application of the oncoming clutch may be detected by comparing the rotational angles at both sides of the transmission 14.

The controller 20 monitors the pulses transmitted by the TISS 26 and TOSS 126, e.g., the example pulses 38-42 of FIG. 3, and then calculates the deformation across the transmission 14 as set forth above. Precise knowledge of when a particular clutch is filled is often difficult to determine with precision. Such information is made available to the controller 20 using the present approach by virtue of the torque estimation steps of method 100. However, clutch fill detection during an upshift the estimated value does not represent an estimated torque as the change in deformation is no longer caused by the torque change, but rather the change in configuration of the transmission with an additional clutch partially applied. Instead, as part of step 112 the controller 20 determines that the fill event has been completed once the change in angular difference goes beyond a calibrated threshold.

In particular, point 58 in FIG. 5 indicates the start of such a divergence, and thus indicates completion of a clutch fill event preparatory to execution of an upshift, e.g., from a lower gear (trace 56) to a higher gear (trace 62). The offgoing clutch starts releasing at approximately point 60. A short time later the shift to the higher gear is completed. Therefore, by using this deformation change, the controller 20 of FIG. 1 can better control subsequent upshifts, for instance by improving the coordination or timing of the clutch to clutch shift, thereby improving shift feel.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a prime mover;
a powertrain having first and a second rotatable members, wherein the powertrain includes a transmission that is connected to the prime mover;
a first and a second speed sensor positioned with respect to the first and second rotatable members, respectively, wherein the first and second speed sensors are configured to generate a corresponding first and second output signal encoding a rotational speed of the first and second rotatable member, respectively; and
a controller in communication with each of the first and second speed sensors;
wherein the controller is configured to:
calculate a rotation angle for each of the first and second rotatable members using the first and the second output signals from the respective first and second speed sensors; and
estimate a torque value in the transmission of the powertrain as a function of the calculated rotation angles and a present gear ratio of the first and second rotatable members as determined via the first and second speed sensors.

2. The vehicle of claim 1, wherein the first and second rotatable members are selected from the group consisting of: an input member, and intermediate member, and an output member of the transmission.

3. The vehicle of claim 1, wherein the first and second speed sensors are configured to count the number of teeth of a toothed gear element of the respective first and second rotatable members, and to encode the count as a pulse train forming the corresponding output signals.

4. The vehicle of claim 1, wherein the prime mover includes at least one of an internal combustion engine and an electric traction motor.

5. The vehicle of claim 1, wherein the controller is configured to estimate the torque value in the transmission as a function of the calculated rotation angles, a linear coefficient, and the present gear ratio.

6. The vehicle of claim 1, wherein the controller is configured to detect a commanded upshift of the transmission, and to detect a fill event of an oncoming clutch of the transmission as a function of the calculated rotation angles for the first and second rotatable members.

7. A method for estimating a torque value in a vehicle powertrain, the method comprising:
measuring a rotational speed of a first rotatable member of the transmission using a first speed sensor;
measuring a rotational speed of a second rotatable member of the transmission using a second speed sensor;
generating a first and a second output signal encoding the measured rotational speeds of the respective first and second rotatable members;
calculating, via a controller in communication with the first and the second speed sensors, a corresponding rotation angle for the respective first and second rotatable members using the corresponding first and second output signals;
estimating a torque value in the transmission of the powertrain, via the controller, as a function of the corresponding rotation angles and a present gear ratio of the first and second rotatable members as determined via the respective first and second speed sensors; and
executing, via the controller, a control action with respect to the powertrain using the estimated torque value.

8. The method of claim 7, wherein measuring the rotational speeds of the first and second rotatable members includes:
counting the number of teeth of a gear element of the first and second rotatable members using the respective first and second speed sensors; and
encoding the tooth count as a pulse train forming the corresponding first and second output signals.

9. The method of claim 7, wherein estimating the torque value is performed by the controller as a function of the calculated rotation angles, linear coefficient, and the present gear ratio.

10. The method of claim 7, further comprising:
detecting a commanded upshift of the transmission; and
executing another control action via the controller using the rotation angles in response to the commanded upshift.

11. The method of claim 7, wherein executing another control action includes detecting a fill event of an oncoming clutch of the transmission.

12. The method of claim 7, wherein:
measuring a rotational speed of a first rotatable member includes measuring a rotational speed of any one of: an input member, an intermediate member, and an output member of the transmission; and measuring a rotational speed of a second rotatable member includes measuring a rotational speed of one any other one of: the input member, the intermediate member, and the output member of the transmission.

13. A system for estimating a torque value in a vehicle powertrain, the system comprising:

a first speed sensor positioned with respect to a first rotatable member of the powertrain, wherein the first speed sensor is configured to generate a first output signal encoding a rotational speed of the first rotatable member;

a second speed sensor positioned with respect to a second rotatable member of the powertrain, wherein the second speed sensor is configured to generate a second output signal encoding a rotational speed of the second rotatable member; and a controller in communication with each of the first and second speed sensors;

wherein the controller is configured to:
calculate a rotation angle for each of the first and second rotatable members using the first and second output signals; and
estimate the torque value of the powertrain as a function of the calculated rotation angles and a present gear ratio of the first and second rotatable members as determined via the respective first and second speed sensors.

14. The system of claim 13, wherein the first and second speed sensors are configured to count the number of teeth of a toothed gear element of the respective first and second rotatable members, and to encode the count as a pulse train forming the corresponding first and second output signals.

15. The system of claim 13, wherein the controller is configured to estimate the torque value as a function of the calculated rotation angles, a linear coefficient, and the present gear ratio.

16. The system of claim 15, wherein the function is:

$$K(\Theta_1 - R_G \cdot \Theta_2)$$

where K is the linear coefficient, $R_G$ is the present gear ratio, and $\Theta_1$ and $\Theta_2$ are the respective calculated rotation angles of the first and second rotatable members.

17. The system of claim 13, wherein the controller is configured to:
detect a commanded upshift of the transmission; and
detect a fill event of an oncoming clutch of the transmission as a function of the calculated rotation angles for the first and second rotatable members.

18. The system of claim 13, wherein:
the first speed sensor is any one of a transmission input speed sensor (TISS), a transmission intermediate speed sensor (TMSS), and a transmission output speed sensor (TISS); and
the second speed sensor is any other one of the TISS, the TMSS, and the TOSS.

19. The vehicle of claim 5, wherein the function is:

$$K(\Theta_1 - R_G \cdot \Theta_2),$$

where K is the linear coefficient, $R_G$ is the present gear ratio, and $\Theta_1$ and $\Theta_2$ are the calculated rotation angles.

20. The method of claim 7, wherein estimating a torque value in the transmission of the powertrain is performed as a function of the linear coefficient, the present gear ratio, and the calculated rotation angles, and wherein the function is:

$$K(\Theta_1 - R_G \cdot \Theta_2).$$

where K is the linear coefficient, $R_G$ is the present gear ratio, and $\Theta_1$ and $\Theta_2$ are the calculated rotation angles for the respective first and second rotatable members.

* * * * *